United States Patent [19]

Salvati et al.

[11] Patent Number: 5,070,401

[45] Date of Patent: Dec. 3, 1991

[54] VIDEO MEASUREMENT SYSTEM WITH AUTOMATIC CALIBRATION AND DISTORTION CORRECTION

[75] Inventors: Jon R. Salvati, Skaneateles; Raymond A. Lia, Auburn, both of N.Y.

[73] Assignee: Welch Allyn, Inc., Skaneateles Falls, N.Y.

[21] Appl. No.: 506,175

[22] Filed: Apr. 9, 1990

[51] Int. Cl.$^5$ .......................... A61B 1/04; H04N 7/18
[52] U.S. Cl. ................................. 358/107; 358/98; 364/560
[58] Field of Search .................. 358/98, 107; 364/560, 364/561, 562, 563

[56] References Cited

U.S. PATENT DOCUMENTS

| | | | |
|---|---|---|---|
| 4,935,810 | 6/1990 | Nonami | 358/107 |
| 4,980,763 | 12/1990 | Lia | 358/98 |
| 4,989,083 | 1/1991 | Eino | 358/107 |

*Primary Examiner*—Howard W. Britton
*Attorney, Agent, or Firm*—Wall and Roehrig

[57] ABSTRACT

An electronic video measurement system for measuring three dimensional parameters of objects viewed by a two dimensional video image pickup. A borescope is provided in which the measurements are corrected for calibration, distortion, lens magnification, and system architecture. Programs and algorithms are provided for calculating various parameters of an object being viewed, including slant lengths and depths without the need for a scale positioned next to the object being measured.

20 Claims, 3 Drawing Sheets

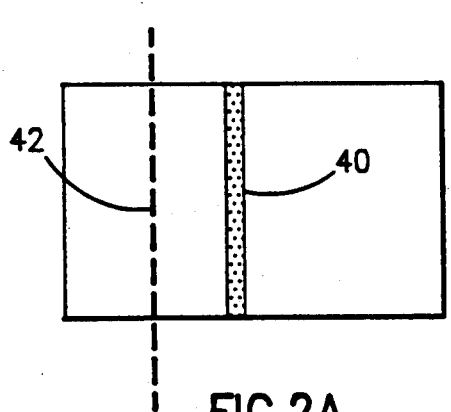 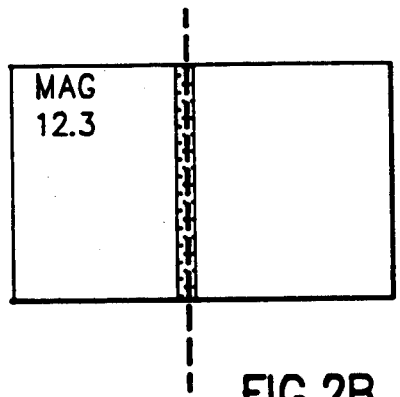
FIG.2A  FIG.2B
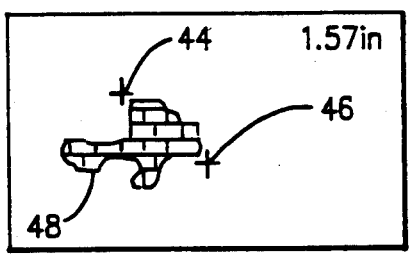
FIG 3
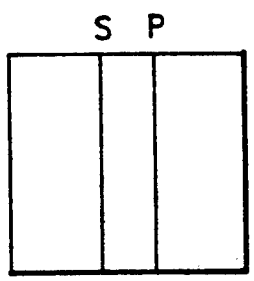 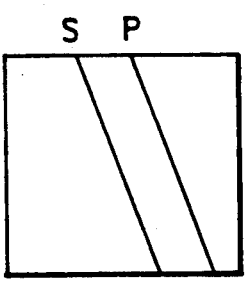 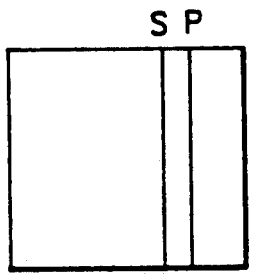 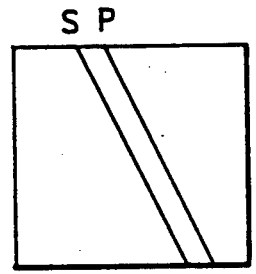
PERPENDICULAR  Y-Z TILT  X-Z TILT  Y-Z & X-Z TILT
FIG.6A  FIG.6B  FIG.6C  FIG.6D

VIDEO MEASUREMENT SYSTEM WITH AUTOMATIC CALIBRATION AND DISTORTION CORRECTION

BACKGROUND OF THE INVENTION

This invention relates to video imaging systems for viewing objects on a video display and more particularly to a system for measuring various parameters of the object being viewed.

In video image display systems such as borescopes and endoscopes for viewing inaccessible remote objects, unless the distance from the lens to the object and hence the magnification is known or a known scale is placed next to the object, accurate measurement of features of the object is impossible. In co-pending application Ser. No. 364,883, filed June 12, 1989, now U.S. Pat. No. 4,980,763 dated Dec. 25, 1990 assigned to the common assignee of the present case, and which application is specifically incorporated herein by reference; there is disclosed a system for providing object distance or magnification information concerning the object being viewed. In said application a supplementary image of known position or size is projected on the object being viewed with the object illumination and then knowing the parameters of the image system the object distance (magnification) is calculated according to the size or position of the supplementary image. Once the object distance is known, the object can be measured by reference to a calibrated scale or the like on the video display. In the referenced application it was also suggested that certain of the measurement functions could be accomplished by counting pixels on the video display screen.

In many applications, particularly in the industrial and medical fields, additional information over and above that provided by a simple two dimensional video display is required. Also, instantaneous real time information is frequently needed. Thus, in addition to the linear dimension of an object, the depth or thickness, positional orientation, surface configuration, etc., are frequently required and these details are frequently needed with great precision.

The present invention provides pixel by pixel calibration and distortion correction to image measurements and also provides a significant amount of three dimensional information about the object being viewed.

OBJECTS AND SUMMARY OF THE INVENTION

Accordingly, it is an object of the present invention to provide a system for measuring objects viewed in a borescope video display and the like that greatly improves the capabilities of previously known systems.

It is another object of the present invention to provide a bit mapped information overlay for a video image system that will allow automatic measurement with built-in compensation for the geometry and physical characteristics of the video imaging system.

It is another object of the present invention to provide a video borescope measurement system that will allow an insertion tube to be calibrated and distortion corrected for use with any standard video display system.

It is a further object of the present invention to provide a measurement system for video borescopes that will measure the size of objects lying in planes other than at right angles to the axis of the lens system.

It is another object of the present invention to obtain substantial three dimensional information from a two dimensional video imaging and display system.

It is a further object of the present invention to provide an electronic video measurement system for borescopes and the like that will automatically sense object distance information, calculate the magnification and measure object size.

In accordance with an aspect of the present invention, we provide calibration and distortion correction information for a particular borescope insertion tube video system in a pixel by pixel format, together with sensing and measuring data for processing with the video information from the borescope video pickup to provide automatic display of dimensional characteristics of the object being viewed.

The above and other objects, features and advantages of this invention will present themselves to those skilled in the art from a reading of the following detailed description considered in connection with the accompanying drawing.

BRIEF DESCRIPTION OF THE DRAWINGS

FIGS. 2A and 2B are diagrammatic views of a locator cursor for determining magnification;

FIG. 3 is another view showing measurement of an object according to an embodiment of the present invention;

FIG. 6 (a-d) is a diagrammatic view of the display of another embodiment of the present invention.

DETAILED DESCRIPTION OF THE EMBODIMENT

Figure 1:
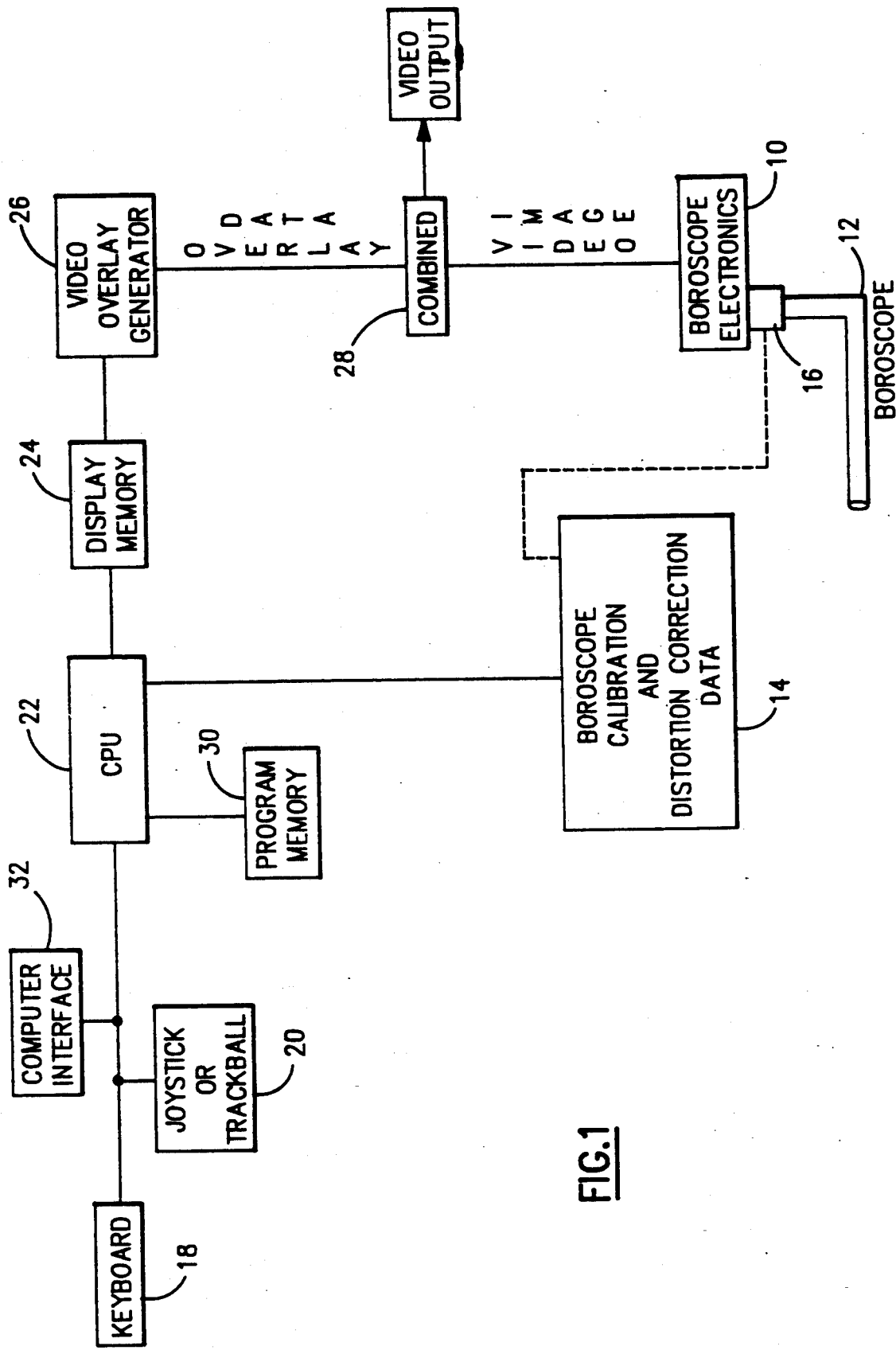
FIG. 1 is a block diagram of a system according to the present invention.

Referring now to FIG. 1 there is shown in block diagram form a system for measuring the characteristics of an object being viewed by a video borescope insertion tube at a remote, inaccessible location. While this embodiment shows the invention applied to a borescope, it can be applied to any video imaging and display system. The system comprises generally a borescope 10, as described in the above referenced Lia patent application, which includes an elongated insertion tube 12 for introduction into remote, inaccessible cavities and which carries in the end thereof means for illuminating the object and a video pick up image sensing head, as is well known in the art. This typical borescope 10 includes a video image output which is normally displayed on a video display screen for viewing the object being observed. The video display screen is not shown in FIG. 1 for sake of simplicity.

As described in the referenced Lia application, a means is provided for determining the object distance of the object being viewed from the lens system and the end of the borescope so that the magnification of the image displayed on the display screen can be known and suitable calculations made as to the correction factors to be applied to the parameters of the object being viewed as they are being measured. The present system provides, in addition to that shown in the previous application, a complete electronic system for accomplishing the measurements automatically, or at least semi-automatically, together with means for compensating for system parameters found in the lens system and the video display system through calibration and distortion correction. The basic calibration and "fish eye" optical distortion data is referenced as block 14, which may be located in a connector/adaptor 16 of an insertion tube 12. Alternately, the data may be separately located in a borescope electronics package or even in an external module, computer interface or electronic look-up table and the like.

The overall system is controlled from a keyboard 18, and joystick or trackball 20 shown in block diagram form, through a CPU 22 which controls the various functions that must be performed with and to the data stored in the program memory 30, display memory 24, borescope data 14, etc., as well as the video data returned from the insertion tube of the borescope. All of this data, after processing, is displayed on the video display through the display memory 24, the video overlay generator 26 and the combiner circuitry 28. The additional program memory 30 is shown as a separate block which may be locally stored or which may be accessed through the computer interface 32 as desired.

As described in the Lia application, the borescope lens system has, in its distal end, a video image pick-up which, because of its physical nature and make-up has certain distortions that are unavoidably included and which, for precise measurements of image characteristics, must be compensated for. The calibration and optical distortion correction data indicated at box 14 is basically the correction data for the overlapping of the fields of view between the object illumination and image, as well as the distortions caused by the image lens system. The geometry of the pixels of the image sensor must also be taken into account. These corrections compensate for the rectangular pixels in the image sensor so that correct dimensions will be obtained, regardless of which axis the pixels are counted in.

All of the information unique to the borescope is generally stored in the box 14 and the information related to the video display will be stored in the display memory 24 including the bit mapped overlay created in the overlay generator 26. The video overlay generator 26 creates the semi-transparent bit mapped information display which is really the user interface to the system and includes locator cursors, status messages, measurement numbers, and other operating information. This overlay is created pixel by pixel to match the video image display.

Program memory 30 has the various sets of instructions on how to use specific information, where to find data, how to interpret and execute commands, how to calculate dimensions, and similar information for directing the CPU 22. For instance, the operating instructions for "Regular" length measurement, "Depth Mode" measurement, "Skew Mode" measurement are all stored in program memory for use as required by the operator through the proper commands entered on the keyboard 18.

CPU 22 gathers all the data, manipulates and processes the data in accordance with the program memory and forwards it to the video display through the display memory 24, generator 26 and combiner 28.

Referring now to FIG. 2, a first step in determining the magnification or the object distance from the image lens to the object being viewed is indicated diagrammatically. As described in the above referenced Lia application, a supplementary image or shadow 40 is created in one embodiment which is displaced from the left hand margin of the display screen in proportion to the distance the image being viewed is from the video image pick up. As shown in FIG. 2, one way of determining this factor is to use a locator cursor 42 (FIG. 2A), created in the overlay generator 26 which can be positioned to coincide with the center of the shadow 40, as shown in FIG. 2B. Since the position of the shadow is directly proportional to the distance of the object from the video pick up lens, knowing the dimensions of the video display screen and specifically, the size of the pixels in the display screen and by counting them from the zero point on the screen to the displacement location of the shadow 40 as determined by cursor 42, the precise image distance can be calculated. As shown in FIG. 2, this can be displayed on the video screen as a magnification factor, such as 12.3 shown in FIG. 2B. Alternatively, this could be displayed in terms of centimeters or inches distant from the video pick-up, if desired.

Since this information is automatically corrected by the video overlay generator 26 for distortion inherent in the display, the insertion tube lens, calibration, and geometry by the circuitry and memory in box 14, the locator cursor and shadow can be utilized on any part of the screen. Without this feature it was preferred to measure the shadow only when in the middle of the display screen. It is thus only necessary in this system to position the locator 42 in the middle of the shadow 40 by use of the joystick or track ball 20 and to then press the appropriate key on the keyboard to cause the CPU to sense and calculate the position of the locator cursor.

When the magnification of the image is known, then it is possible to determine the "regular" measurements of other parameters of the object being viewed. For instance, if it is desired to know the distance between points 44 and 46 on the object 48 (FIG. 3), it is a simple matter having established the magnification to place a cursor at 44 and a second cursor at 46 and to merely count the number of pixels between the two locations and to then correct for the aspect ratio of the imager pixels and the lens distortion of the borescope and so forth, to yield a precise measurement which again can be displayed as shown as 1.57 inches for instance. The measurement cursor can be placed first on one point and then the other and the necessary commands given through the keyboard or dual cursors can be used, whichever is most convenient for the particular system software being used.

This type of measurement presumes that the object being viewed is in a plane essentially perpendicular to the optical axis of the video image pick-up so that variations in depth of field or distance from the lens to the image can be ignored in measuring the distance parameters along the surface of the object. The simple depth of small imperfections in a jet engine blade, for instance, can be determined by simple measurements of the displacement of the shadow.

Figure 4:
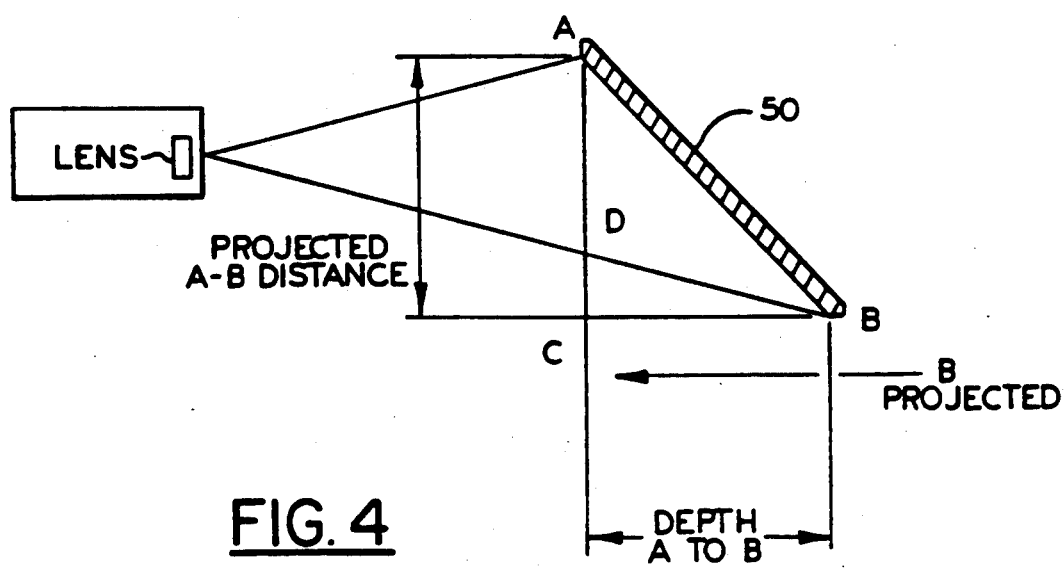
FIG. 4 is a diagrammatic view of another form of measurement in accordance with the present invention.

Referring now to FIG. 4, if it is desired to measure an object length that is not in a plane at right angles to the optical axis of the video pick-up system, it is still possible with the system of the present invention to accurately measure an object in the third dimension. This third dimension may be merely the "depth mode", i.e., the distance between two planes still perpendicular to the optical axis of the video image pickup or it can be "skew mode", i.e., the distance from point A to point B in a plane at any angle to the optical axis. In FIG. 4, the object 50 is shown at approximately 45° to the axis of the lens system and obviously, the magnification of the lens system for the different parts of the object will be different and will effect the measurements. To solve this particular problem, it is necessary to first obtain the depth or object distance of the points A and B separately by causing the shadow 40 to fall on the two points that it is desired to measure. This can be done in a variety of ways with the preferable method being to have a single shadow that is skewed in the video display from point A to point B so that the video pick up head does not have to be moved in order to obtain the object distance of the two points A and B. As shown diagrammatically in FIG. 5, this is accomplished by rotating the video pickup head of the borescope so that the distance to be measured lies within the shadow projected on the object being viewed. Obviously, the object could be moved but as a practical matter, usually it is much easier to adjust the insertion tube.

As described in the foregoing Lia application, as an object recedes or is positioned further from the image pick up head, the shadow cast by the auxiliary shadow mechanism tends to move to the right in a display such as FIGS. 2 and 3, and thus for a typical object, the shadow could very well extend from point A toward the left of the screen to point B displaced to the right of the screen because the point B obviously is further from the lens system and thus the shadow at that point would be displaced to the right in FIGS. 2 and 3 by an appropriate amount.

In operation, the locator cursor 42 would be first over the shadow at point A and the magnification and/or distance of the object noted. The cursor would then next be placed over the shadow at point B and again the distance to the object noted. By subtracting the depth of A from the depth of B, the distance CB in FIG. 4 can be readily determined. If the distance from A to C can be determined, then the distance from A to B can be calculated using the well known square root of the sum of the squares law. To obtain the distance, AC, one must know the apparent image length of AD on the video display. The dimension AD can be measured on the video display by counting pixels and with the known depths of A and B as previously determined, and the known included angle of the lens system, the distance CD can be calculated and added to AD so that the AC projected distance is determined. The slant distance AB along the object 50 can be readily calculated from the formula $(AB)^2 = (AC)^2 + (BC)^2$. The program for these is stored in the memory 30 and the CPU 22 upon proper instruction via keyboard 18 gives an accurate lineal distance of the length of the object 50, even though it is tipped at a considerable angle to the axis of the video pick-up lens system.

Figure 5:
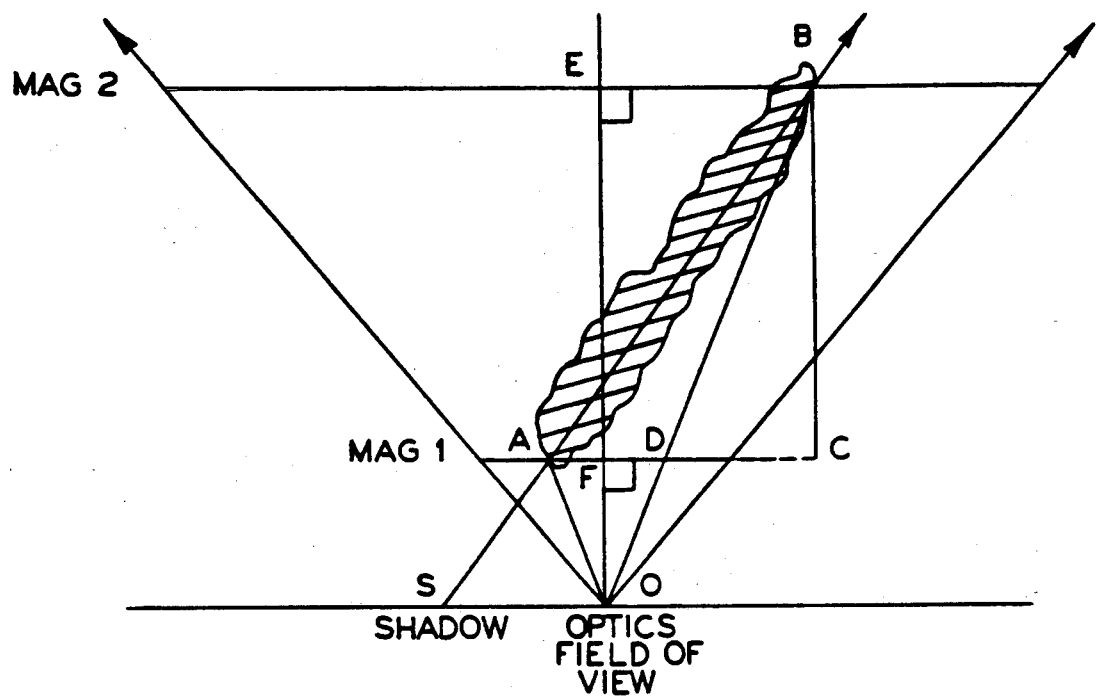
FIG. 5 is a diagrammatic view showing the mathematical and physical relationships of an object at an angle other than perpendicular to the optical axis.

The geometry of these relations is shown in FIG. 5 and is represented by the following equations:

$$BE = CE \quad (1)$$

$$BE = DF \times MAG\ 2/MAG\ 1 \quad (2)$$

$$CA = CF + FA = BE + FA \quad (3)$$

$$OBJECT = BA = \sqrt{CA^2 + BC^2} \quad (4)$$

Alternatively, this same measurement can be made by determining the three dimensional coordinates in x, y and z directions for both points A and B and calculating the linear distance from this three dimensional coordinate information by applying an appropriate algorithm stored in memory 30.

With the complete physical data of the display and of the borescope insertion tube video lens system and the shadow generating system all stored in the memory it is a simple matter through the locator cursor to determine the object distance or depth of the object at any given point and through the standard mathematical algorithms to calculate the distance from any given point to another. With the apparatus of FIG. 1, the two cursor measurements are taken and the "skew mode" key actuated and the system will do the rest displaying the measurement on the video display.

Referring now to FIG. 6, there is shown another embodiment of the present invention. As is well known in geometry, if three points within a plane can be determined, the position and location of the plane relative to an object can be calculated. Accordingly, in this embodiment, we provide a primary shadow and a secondary shadow in the object illumination for projection onto the object to be viewed and measured.

When viewed on a plane perpendicular to the optical axis of the image system, a display as seen in FIG. 6('a) will result. In this case, measurement of the primary shadow displacement will give object distance just as before. The spacing of the lines will appear constant on the display regardless of the distance of the plane from the lens and in one embodiment, is set at forty pixels.

In FIG. 6(b) there is shown an object plane tilted in the vertical plane only. In the case shown, the bottom of the object plane is further from the image lens than the top and the angle can be calculated from the slope of the lines in the display. In the case of a plane closer to the lens at the bottom, the slope would be displaced 90 degrees from that shown.

FIG. 6(c) shows the case of a plane tilted in the horizontal plane only. Because of the geometry of the system, one shadow will be further away form the lens than the other and the projected spacing of the shadows will be more or less when displayed on the video display, depending on the angle of the plane relative to the optical axis of the image system when compared to a perpendicular plane as in FIG. 6(A). The angle and direction can be calculated from the spacing of the shadows based FIG. 6(d) shows the case of both vertical and horizontal tilting and again, the amounts can be calculated from the slope and spacing and the direction determined as before.

Thus, with the dual shadow, or other known auxiliary images, the location of any plane can be determined, from any two points in the primary shadow and one point in the secondary shadow. Measurements of an object lying anywhere in that plane, corrected for its position relative to the image pick up axis, can then be made.

Referring now to FIG. 2, if it were desired to use a fully automatic system, the shadow 40 could be sensed by sensing the shadow position with a light sensing circuit and then calculating the number of pixels from zero index to the center of the shadow and translating it to magnification. While this has the advantage of removing all possible operator error, it is considerably more involved and requires considerably more memory, CPU capacity, components, etc.

As disclosed in the prior referenced Lia application, it may be desired to use a constant diameter laser ring image rather than a linear shadow for determining the object distance as described in detail in said application. This method of determining object distance can be readily incorporated into the present invention and used if desired to determine magnification or object distance, from which the other parameters can be calculated. The actual video display will not be corrected for the various factors indicated, but the calculations and measurements made within the system will all be corrected so that the measurements displayed on the video screen will be as accurate as possible.

There is thus provided an automatic system for measuring various parameters of an object being viewed by a video imaging system without the need for a known scale being juxtaposed with the object being viewed or other positioning devices being employed with the borescope insertion tube distal end. The process of measuring is greatly facilitated and speeded up over that disclosed and shown in the prior art. The additional capability of measuring three dimensional characteristics while perhaps theoretically possible with the prior art, is practically impossible without the present invention.

While this invention has been explained with reference to the structure disclosed herein, it is not confined to the details as set forth and this application is intended to cover any modifications and changes as may come within the scope of the following claims.

What is claimed is:

1. In a borescope having an elongated insertion tube for viewing inaccessible objects and a video image pickup in the distal end thereof for producing a video image for viewing on a video display the method of measuring the size of the object being viewed by determining the location of a known supplementary image relative to said object being viewed, including the steps of:

projecting a known supplementary images into the object to be measured;
   detecting said supplementary and object images;
   displaying said detected supplementary and object images on a video display;
   electronically counting the number of pixels in the video display screen between an initial point and the supplementary image location to determine object distance;
   electronically counting the number of pixels in the video display between a first and second location on the object to be measured;
   applying pixel by pixel calibration and distortion correction factors to the pixel counting steps;
   calculating and displaying on a video display the actual dimension represented by the number of pixels counted in the counting steps corrected for calibration, distortion and object distance.

2. In a system for viewing objects having a video image pick-up and display, the method of measuring characteristics of the object being viewed which comprises the steps of:

projecting an image with at least one known characteristic on the object to be viewed;
   causing said known characteristic to vary in proportion to the distance the object to be viewed is from the video image pick-up;
   detecting the object image and the known characteristic image;
   displaying the detected images on a video display;
   measuring the variation of the known characteristic of the created image to determine object distance;
   measuring a desired characteristic of the object being viewed;
   creating a table of calibration and correction factors for the video pick-up and display;
   calculating a corrected measurement of the desired characteristic of the object being viewed using said table of calibration and correcting factors and the created image variation measurement; and
   displaying the calculated result to indicate the measurement of the characteristic of the object being viewed.

3. The method of claim 2 further defined by electronically measuring the variation in the known characteristics of the created image to determine object distance; electronically applying a bit by bit mapped overlay to the video display corrected for calibration and distortion errors; electronically measuring the desired characteristic of the object being viewed; and electronically calculating a corrected characteristic measurement of the object being measured.

4. In a system for measuring dimensions of an object being viewed with a video borescope having a video image pick-up and display, the method of electronically determining the actual physical dimensions of the object which is being viewed including the steps of:

a.) creating a pixel by pixel set of calibration and distortion correction factors for a video image pick-up video display system;
   b.) creating a bit mapped information overlay on a one for one pixel basis for the video display to display various information on the display;
   c.) creating a known object distance image in the borescope illumination system and projecting it into the field of view thereof so as to fall on the object to be measured;
   d.) counting pixels to determine the location of said object distance image on the object being viewed to determine the video image pickup system magnification for the object being viewed;
   e.) counting the number of pixels between first and second locations on the object being viewed;
   f.) combining the data obtained in the foregoing steps with the video information from the borescope;
   g.) calculating the corrected distance between said first and second locations on the object being viewed for the magnification, calibration and distortion factors determined in steps a) through d) for the first and second locations on the object being viewed.

5. The method of claim 4 further defined by counting the pixels in X and Y coordinate directions for said first and second locations;

determining the magnification for each of said first and second locations on the objects being viewed; and
   calculating the true distance between said first and second locations from the projected X-Y distance and the X-Y depth.

6. In a system for viewing objects with a video image pickup and displaying them on a video display, the method of measuring three dimensional characteristic of an object being viewed comprising the steps of:
   illuminating the object to be viewed;
   creating a shadow in said illumination that is displaced across one dimension of the video display in proportion to the object distance from the video image pickup;

positioning the object to be measured and the video image pickup so that the object lies within said shadow;

measuring the object distance of two spaced apart points on the object to be measured while positioned within said shadow by measuring the displacement of said shadow at the respective two points;

measuring the apparent distance between the two spaced apart points as shown on the video display; and calculating the actual distance between the two points on the object by the difference in object distance obtained from the shadow measurement, the measured apparent distance and the geometry of the video image pickup device.

7. The method of claim 6 further defined by correcting the measurements of the two spaced apart for distortion due to the video image pickup system and the video display to provide a true distance measurement.

8. In a system for viewing objects with a video image pickup and displaying them on a video display according to claim 6 further comprising:

measuring the X and Y coordinates of two spaced apart points on the object to be measured;

measuring the Z coordinate of the two spaced apart points on the object to be measured by determining the object distance of the two points from the displacement of the shadow image; and calculating the straight line distance between the two points from the measured x y z coordinates of the points.

9. The method of claim 6 further defined by making the measurements of the two spaced apart points by counting the number of pixels on the video display between a zero index point and said two spaced apart points.

10. The method of claim 9 further defined by mapping the configuration of the object being measured by measuring the object distance of a plurality of points on the object to be measured located within said shadow.

11. In a system for viewing objects having a video image pick-up and display, the method of measuring characteristics of the object being viewed which comprises the steps of;

creating first and second images on the object to be viewed, each image having at least one known characteristic causing a first known characteristic of said first image to vary in proportion to the distance the object to be viewed is from the video image pick-up;

causing a second known characteristic of said first image to vary in proportion to a first angle of the plane of the image to the optical axis;

causing a first known characteristic of said second image to vary in proportion to a second angle of the plane of the image to the optical axis;

detecting the object image and the known characteristic image;

displaying the detected images on a video display;

measuring the variation of the known characteristics of the created images to determine object distance and plane angles;

calculating the measurement of a desired characteristic of the object being viewed using the created image variation measurements; and displaying the calculated result to indicate the measurement of the characteristic of the object being viewed.

12. In a system for viewing objects having a video image pick-up and display, the method of measuring characteristics of the object being viewed which comprises the steps of:

illuminating the object to be viewed;

creating an image on the object to be viewed with at least two known characteristics;

causing said first known characteristic to vary in proportion to the distance the object to be viewed is from the video image pick-up;

causing said second known characteristic to vary in proportion to the angle of the plane, in which the object being viewed lies, to the optical axis of the system;

detecting the object image and the known characteristics images;

displaying the detected images on a video display;

measuring the variation of the known characteristics of the created images to determine object distance and plane angle;

measuring a desired characteristic of the object being viewed;

calculating a corrected measurement of the desired characteristic of the object being viewed using the determined object distance and plane angle whereby an accurate measurement can be made of an object lying in planes other than at right angles to the optical axis of the system.

13. The method of claim 12 further defined by creating a primary and secondary shadow line image on the object to be viewed, and varying the displacement of the primary shadow in proportion to the object distance and varying the displacement of the secondary shadow relative to the primary shadow in proportion to one axis angle of the object plane and varying the angle of the shadow lines in proportion to a second axis angle of the object plane.

14. An apparatus for measuring the dimensions of an object being viewed on a video display of a video image pickup system which comprises:

a video system having an illumination source for illuminating the object to be viewed, and a video image sensor operatively associated therewith to detect an image of the object illuminated;

means for creating an image of known characteristics in the illumination source;

means for measuring at least one of the characteristics of said known image when projected on said object to be viewed;

data storage means for storing calibration and distortion correction information for the video image sensor;

video display means operatively connected to said video image sensor;

video display overlay generator means operatively connected to said video display means;

computer CPU means operatively connected to said data storage means and said video overlay generator means for counting pixels on the video display and for calculating corrected pixel dimensional information for said counted pixel information and displaying same on the video display whereby dimensional information about the object being viewed can be determined and displayed.

15. Apparatus as described in claim 14 wherein said video system is a video borescope having an insertion tube with the illumination source and video image sensor positioned in the distal end thereof.

16. In a system for viewing objects having a video image sensor and video display, apparatus for measuring characteristics of the object being viewed which comprises:

means for creating two images with at least one known characteristic each on the object to be viewed;

said image creating means causing at least one of said known characteristics to vary in proportion to the distance the object to be viewed is from the video image pick-up;

video sensor means for detecting the object image and the known characteristic image;

a video display for viewing the detected images;

means for measuring the variation of the known characteristics of the created images to determine object plane;

means for measuring a desired characteristic of the object being viewed;

computer means for calculating a corrected measurement of the desired characteristic of the object being viewed in accordance with the measured variation of the known characteristics.

17. Apparatus as described in claim 16 wherein said means for measuring the object characteristics includes means for counting pixels on the video display between selected points on the object.

18. Apparatus as described in claim 16 wherein said means for creating an image includes means for illuminating the object to be viewed and a pair of spaced apart shadow bars mounted in said illuminating means to project a pair of shadow lines on the object to be viewed.

19. Apparatus as described in claim 18 wherein said shadow bars are mounted off center from the optical axis of said illumination means whereby the shadows created will be displaced in one direction in proportion to the object distance and the spacing between the bars will vary relative to a first angle of the plane of the object to the optical axis.

20. Apparatus as described in claim 19 wherein the shadow bars are mounted so that the angle of the shadow lines created on the object to be viewed will vary in the video display in proportion to a second angle of the plane of the object being viewed relative to the optical axis.

* * * * *

UNITED STATES PATENT AND TRADEMARK OFFICE
CERTIFICATE OF CORRECTION

PATENT NO.         : 5,070,401
APPLICATION NO. : 07/506175
DATED                : December 3, 1991
INVENTOR(S)      : Jon R. Salvati and Raymond A. Lia It is certified that error appears in the above-identified patent and that said Letters Patent is hereby corrected as shown below:

Column 7, Line 40. Please delete the "s" at the end of the word "image".
Column 7, Line 40. Please delete the word "into" and replace with --onto--.
Column 7, Line 46. Please insert the word --index-- after the word "initial".
Column 9, Line 20. Please insert the word --points-- after the word "apart".
Column 10, Line 48. Please insert the word --illuminated-- before the word "object"; delete the word "illuminated" after the word "object".

Signed and Sealed this

Twentieth Day of February, 2007

JON W. DUDAS
*Director of the United States Patent and Trademark Office*